(12) United States Patent
Misener et al.

(10) Patent No.: US 12,555,991 B2
(45) Date of Patent: *Feb. 17, 2026

(54) CONFIGURABLE ELECTRICAL RECEPTACLES

(71) Applicant: SWIDGET CORPORATION, Kingston (CA)

(72) Inventors: Donald Lowell Misener, Kingston (CA); Christopher Adamson, Kingston (CA)

(73) Assignee: SWIDGET CORPORATION, Kingston (CA)

( * ) Notice: Subject to any disclaimer, the term of this patent is extended or adjusted under 35 U.S.C. 154(b) by 329 days.

This patent is subject to a terminal disclaimer.

(21) Appl. No.: 18/296,847

(22) Filed: Apr. 6, 2023

(65) Prior Publication Data

US 2023/0253773 A1 Aug. 10, 2023

Related U.S. Application Data

(63) Continuation-in-part of application No. 17/346,844, filed on Jun. 14, 2021, now Pat. No. 11,646,559, which is a continuation of application No. 16/947,174, filed on Jul. 21, 2020, now Pat. No. 11,095,106, which is a continuation of application No. 16/011,212, filed on Jun. 18, 2018, now Pat. No. 10,720,764.

(60) Provisional application No. 62/524,735, filed on Jun. 26, 2017.

(51) Int. Cl.
*H02G 3/18* (2006.01)
*F21S 9/02* (2006.01)
*H01R 13/506* (2006.01)
*H01R 13/514* (2006.01)
*H01R 13/64* (2006.01)
*H01R 13/66* (2006.01)
*H01R 24/22* (2011.01)
*H01R 25/00* (2006.01)

(52) U.S. Cl.
CPC ............... *H02G 3/18* (2013.01); *F21S 9/022* (2013.01); *H01R 13/506* (2013.01); *H01R 13/665* (2013.01); *H01R 13/514* (2013.01); *H01R 13/64* (2013.01); *H01R 24/22* (2013.01); *H01R 25/006* (2013.01)

(58) Field of Classification Search
CPC .. H01R 13/665; H01R 13/506; H01R 13/514; H01R 13/64; H01R 24/22; H01R 25/006; H01R 2103/00; H02G 3/18; F21S 9/022
USPC .................................................. 439/535–539
See application file for complete search history.

(56) References Cited

U.S. PATENT DOCUMENTS

| | | | | |
|---|---|---|---|---|
| 8,496,342 | B2 * | 7/2013 | Misener | H02G 3/18 174/50 |
| 9,083,126 | B2 * | 7/2015 | Misener | H01R 13/717 |
| 10,720,764 | B2 * | 7/2020 | Misener | H01R 13/665 |
| 11,095,106 | B2 * | 8/2021 | Misener | F21S 9/022 |
| 11,646,599 | B2 * | 5/2023 | Ino | H02J 7/342 320/128 |

* cited by examiner

*Primary Examiner* — Gary F Paumen
(74) *Attorney, Agent, or Firm* — Stratford Group Ltd.

(57) ABSTRACT

This invention relates to configurable electrical receptacles and more particularly to electrical receptacles that accept in-situ replacement of an insert providing a specific functionality within an electrical receptacle which is configurable to function or user accessible feature.

14 Claims, 15 Drawing Sheets

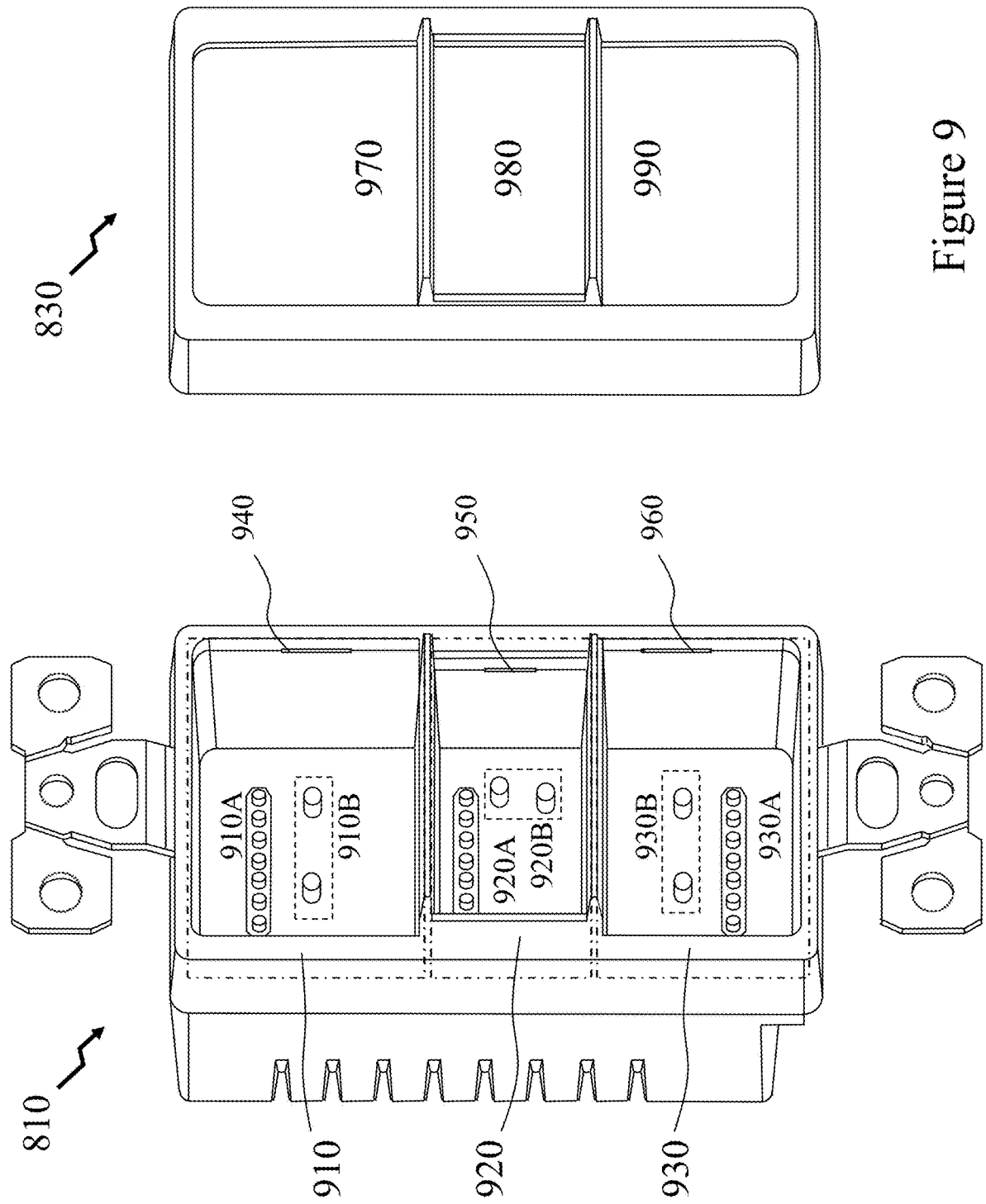

CONFIGURABLE ELECTRICAL RECEPTACLES

CROSS-REFERENCE TO RELATED APPLICATIONS

This patent application claims the benefit of priority as a continuation-in-part of U.S. patent application Ser. No. 17/346,844 filed Jun. 14, 2021; which itself claims the benefit of priority as a continuation of U.S. Ser. No. 16/947, 174 filed Jul. 21, 2020 which has issued as U.S. Pat. No. 11,095,106; which itself claims the benefit of priority as a continuation of U.S. patent application Ser. No. 16/011,212 filed 18 Jun. 2018 which has issued as U.S. Pat. No. 10,720,764; which itself claims the benefit of priority from U.S. Provisional Patent Application 62/524,735 filed 26 Jun. 2017; the entire contents of each being incorporated herein by reference.

FIELD OF THE INVENTION

This patent application relates to configurable electrical receptacles and more particularly to electrical receptacles that accept in-situ replacement of an insert providing a specific functionality within an electrical receptacle which is configurable to function or user accessible feature.

BACKGROUND OF THE INVENTION

Home automation or smart homes (also known as domotics) refers to building automation for the home. It involves the control and automation of lighting, heating (such as smart thermostats), ventilation, air conditioning (HVAC), and security, as well as home appliances such as washer/dryers, ovens or refrigerators/freezers. Wi-Fi is often used for remote monitoring and control. Home devices, when remotely monitored and controlled via the Internet, are an important constituent of the Internet of Things. Modern systems generally consist of switches and sensors connected to a central hub sometimes called a "gateway" from which the system is controlled with a user interface that is interacted either with a wall-mounted terminal, mobile phone software, tablet computer or a web interface, often but not always via Internet cloud services.

Whilst today there are many competing vendors, there are very few worldwide accepted industry standards and the home automation market is heavily fragmented. Popular communications protocol for products include X10, Ethernet, RS-485, 6LoWPAN, Bluetooth LE (BLE), ZigBee and Z-Wave, or other proprietary protocols all of which are incompatible with each other. Manufacturers often prevent independent implementations by withholding documentation. The home automation market was worth approximately US$5.75 billion in 2015 and is predicted to have a market value over US$10 billion by the year 2020.

Home automation represents part of the building automation environment as in addition to residential deployments there are markets for commercial environments, manufacturing environments, public buildings, and retail environments. Typically, each element within such automation deployments is undertaken as a discrete deployment such that electrical power distribution for consumption, electrical power and switching for lighting, environmental sensors, security sensors etc. are all discrete.

Within the prior art approaches to combine disparate functionality within a single electrical receptacle exist such as those presented within U.S. Pat. Nos. 5,473,517; 6,010, 288; 6,000,807; 6,045,232; and 6,805,469. These seeking to simply combine emergency lighting within electrical wall receptacles.

Accordingly, one of the inventors established a concept depicted and described in respect of FIG. 1 wherein an electrical mains outlet receptacle was modified to accept a replaceable insert which provided a functionality according to the insert employed. Such inserts including, for example, elements comprising an optical emitter (e.g. LED lighting), an optical sensor, a chemical sensor, a biological sensor, a motion sensor, a rechargeable battery, a gas detector, a microphone, a loudspeaker, a DC power socket (e.g. USB), a low voltage power socket (e.g. 12V), wireless router, wireless networking interface, telecommunications network jack, and a telecommunications socket. This concept being presented within U.S. Pat. Nos. 8,496,342; 9,083,126; 9,214,773; and 9,520,671 wherein the insert is replaceable once the electrical receptacle has been installed and the cover plate attached. Accordingly, functionality can be defined once the building is wired according to the requirements of the owner/occupier and then subsequently revised according to the evolving requirements of the owner/occupier or a new owner/occupier etc.

However, it would be beneficial to enhance and extend such a methodology to support other electrical receptacles, such as switch receptacles for example, as well as providing configurable electrical receptacles that then support reconfiguration through the replaceable insert. In this manner, the electrical receptacles are defined to a first level when installed, e.g. power outlet or electrical switch, and then subsequently defined at a second level once the cover plate etc. have been attached.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to configurable electrical receptacles and more particularly to electrical receptacles that accept in-situ replacement of an insert providing a specific functionality within an electrical receptacle which is configurable to function or user accessible feature.

In accordance with an embodiment of the invention there is provided a device for use in conjunction with a conventional electrical utility work box and a faceplate comprising:
- a housing to fit within an electrical utility work box comprising at least a front face; the housing comprising;
- a first mounting means to affix the housing to the electrical utility work box;
- a second mounting means to affix the faceplate to the housing;
- a plurality of electrical interfaces, each electrical interface allowing connection to a predetermined electrical signal forming part of an electrical lighting circuit; and
- a cavity disposed within the front face of the housing allowing the insertion and removal of a demountable insert into and from the front face of the housing when the housing is mounted within the electrical utility work box with the faceplate attached and comprising a first part of a retention means to retain the demountable insert when inserted into the cavity, the cavity accessible through a first opening in the faceplate and comprising a plurality of first contacts, each first contact electrically coupled to a predetermined electrical interface of the housing; wherein the demountable insert is sized for insertion into the cavity within the front face of the housing and capable of insertion and removal when the faceplate is attached to the housing, the demountable insert comprising a second part of the retention means to retain the demountable insert when inserted into the cavity.

In accordance with an embodiment of the invention there is provided a device for use in conjunction with a conventional electrical utility work box and a faceplate comprising:

a housing to fit within an electrical utility work box comprising at least a front face; the housing comprising;

a first mounting means to affix the housing to the electrical utility work box;

a second mounting means to affix the faceplate to the housing;

a plurality of electrical interfaces, each electrical interface allowing connection to a predetermined electrical signal forming part of an electrical lighting circuit;

a first cavity disposed within the front face of the housing allowing the insertion and removal of a first demountable insert into and from the front face of the housing when the housing is mounted within the electrical utility work box with the faceplate removed;

a second cavity disposed within the front face of the housing allowing the insertion and removal of a second demountable insert into and from the front face of the housing when the housing is mounted within the electrical utility work box with the faceplate attached.

In accordance with an embodiment of the invention there is provided a device for use in conjunction with a conventional electrical utility work box and a faceplate comprising:

a housing to fit within an electrical utility work box comprising at least a front face; the housing comprising;

a first mounting means to affix the housing to the electrical utility work box;

a second mounting means to affix the faceplate to the housing;

an electrical element providing a predetermined electrical function;

a plurality of electrical interfaces, each electrical interface allowing connection to a predetermined electrical signal forming part of an electrical circuit; and a cavity disposed within the front face of the housing allowing the insertion and removal of a demountable insert into and from the front face of the housing when the housing is mounted within the electrical utility work box with the faceplate attached and comprising a first part of a retention means to retain the demountable insert when inserted into the cavity, the cavity accessible through a first opening in the faceplate and comprising a plurality of first contacts, each first contact electrically coupled to a predetermined electrical interface of the housing; wherein the demountable insert is sized for insertion into the cavity within the front face of the housing and capable of insertion and removal when the faceplate is attached to the housing, the demountable insert comprising a second part of the retention means to retain the demountable insert when inserted into the cavity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 9 depicts the configurable electrical receptacle and cover of the embodiment of the invention depicted in FIG. 8A;

DETAILED DESCRIPTION

Figure 1A:
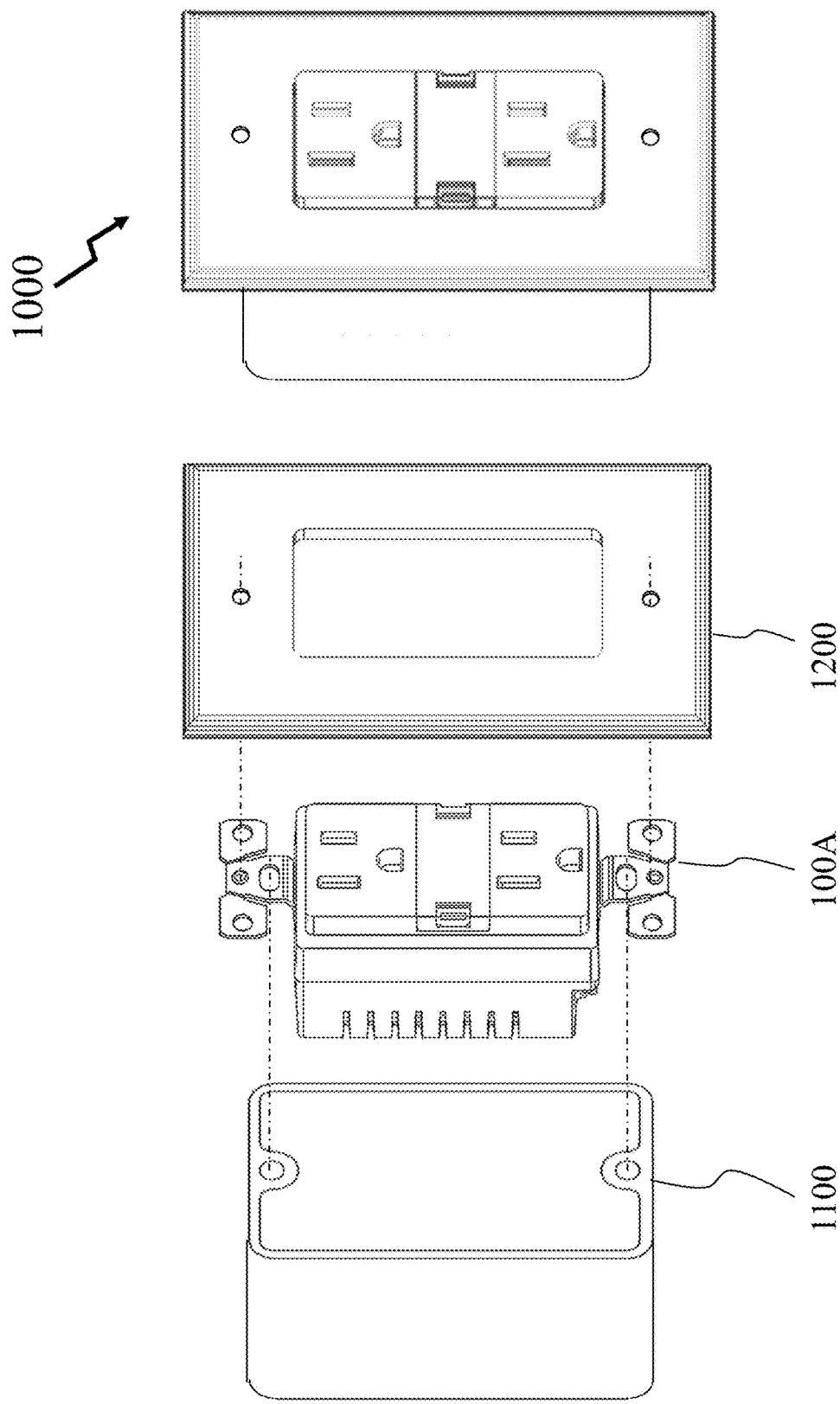
FIG. 1A depicts a work box, receptacle and faceplate according to the prior art of the inventor.

The present invention is directed to configurable electrical receptacles and more particularly to electrical receptacles that accept in-situ replacement of an insert providing a specific functionality within an electrical receptacle which is configurable to function or user accessible feature.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

An "electrical receptacle" as used herein and throughout this disclosure refers to, but is not limited, to a housing design designed to be inserted into a work box/electrical utility work box and connected to one or more electrical cables providing power distribution/signal distribution within the environment exploiting embodiments of the invention which may for example be residential, commercial, industrial, entertainment and retail for example. An electrical receptacle may be manufactured with a predetermined function, e.g. electrical outlet or lighting switch, or it may be configurable as described below in respect of embodiments of the invention.

An "electrical receptacle" as used herein and throughout this disclosure refers to, but is not limited to, simplex, duplex, commercial grade, residential (decorator) grade, hospital grade, ground fault circuit interrupter (GFCI), surge protective, arc fault circuit interrupter (AFCI), and tamper resistant. Electrical receptacles may be 110V/120V, 220V/230V/240V, 50 Hz, 60 Hz, 5 A, 6 A, 10 A, 13 A, 15 A, polarized, unpolarised, earthed, fused, ground fault interrupted and arc circuit interrupted. Typically, the electrical receptacle will include a retention means for fastening a faceplate onto the electrical receptacle covering the exposed portions of the electrical receptacle/electrical utility work box.

A "work box" or "electrical utility work box" as used herein and throughout this disclosure refers to, but is not limited to, the housing that an electrical receptacle is assembled into. As such a work box can include so-called handy box, junction box, new work boxes, old work boxes, outdoor boxes, standard rectangular boxes, square boxes, circular or octagonal boxes, and a ceiling box. A work box may be formed from metal, plastic or PVC. Some electrical utility work boxes are defined as being 1-gang/2-gang/3-gang/4-gang etc. which defines the width such that they may contain multiple electrical receptacles as a typical electrical power outlet or electrical switch is 1-gang wide (i.e. they can be ganged together within the work box).

An "electrical outlet" as used herein and throughout this disclosure refers to, but is not limited to, an electrical receptacle that is configured for providing electrical power, typically at so-called "mains" voltage being that supplied to the environment the outlet is deployed within by the electrical distribution network. As such the "mains" voltage is defined by region/country globally. Electrical receptacles may be 110V/120V, 220V/230V/240V, 50 Hz, 60 Hz, 5 A, 6 A, 10 A, 13 A, 15 A, polarized, unpolarised, earthed, fused, employ insulated pins, have an even number of pins, and have an odd or even number of pins etc. and employ ground fault and/or arc fault interrupter circuits that trigger under predetermined conditions to disable the outlet until the fault is corrected and the circuit reset. However, electrical outlets may provide DC power or AC power at a different current and/or voltage than that to which they are connected depending upon their configuration.

A "switch receptacle" as used herein and throughout this disclosure refers to, but is not limited to, an electrical receptacle that is configured for providing switching functionality, e.g. turning on/off a light or lights or an electrical device/system for which the switching functionality controls power. A switch receptacle may provide control of an electrical distribution circuit, e.g. be a circuit breaker, or distribution panel comprising other switch receptacles, e.g. circuit breakers. Accordingly, a switch receptacle may vary, for example, in the number of switches and their wired interconnection(s) such that the switch may be single pole, double pole, etc. The switch may control the same voltage and/or current as that which powers the switch receptacle to provide the inserts with functionality or alternatively, the switch may control connection and/or disconnection of a system at a different voltage either derived from the power supply that powers the receptacle or coupled to the switch receptacle via a separate connection. Accordingly, a switch may be powered from and/or controlling an electrical circuit at 110V/120V, 220V/230V/240V, 50 Hz, 60 Hz, 5 A, 6 A, 10 A, 13 A, 15 A, alternating current (AC), direct current (DC), 12V, 24V, and 48V.

A "plug" as used herein and throughout this disclosure refers to, but is not limited to, one half of an electrical connector with the other half being the socket. The plug is usually considered the male portion of an electrical connector and comprises one or more pins or jacks that are designed to mate with their corresponding socket.

A "socket" as used herein and throughout this disclosure refers to, but is not limited to, one half of an electrical connector with the other half being the plug. The socket is usually considered the female portion of an electrical connector and comprises one or more openings that are designed to mate with their corresponding plug pins or jack.

An "electrical connector" as used herein and throughout this disclosure refers to, but is not limited to an electro-mechanical device used to join electrical terminations and create an electrical circuit. Electrical connectors typically consist of plugs (male-ended) and jacks (female-ended). The connection may be made/unmade manually or may require a tool for assembly and removal.

A "faceplate" (also referred to as wall plate, outlet cover, or socket cover) as used herein and throughout this disclosure refers to, but is not limited to, a typically plastic cover designed to fit around and/or over an electrical receptacle or switch receptacle and enclose said receptacle within the work box whilst overlapping the surrounding wall/ceiling etc. to provide an aesthetically and/or functional cover. Some faceplates may include a cover to protect the socket when not in use such as in wet outdoor environments for example.

An "electrical contact" as used herein and throughout this disclosure refers to, but is not limited to, an electrical connection between a first element (e.g. a pin of a plug) with a second element (e.g. a receptacle within a socket). Such electrical contacts may be around the periphery of the pin, on a particular surface of the pin, or particular surface of the pin. Some electrical contacts may be sprung to maintain connection over a range of relative positions of the two elements.

A "demountable insert" or "insert" as used herein and throughout this disclosure refers to, but is not limited to, an assembly designed to be inserted within an opening/recess within an electrical and/or switch receptacle. Accordingly, a demountable insert may be inserted/removed through the faceplate without requiring the removal of the face plate.

A "retention means" as used herein and throughout this disclosure refers to, but is not limited to, a means of attaching one element to another element. As such a retention means may include, but not be limited, a screw, a bolt, a nut and bolt, a latch, a screw, and a clip.

An "electrical supply" as used herein and throughout this disclosure refers to, but is not limited to, an electrical power supply to which an electrical receptacle or switch receptacle is connected in order to provide electrical power for the receptacle, it's user accessible features such as a socket, switch, etc. and the provide power to the demountable insert(s) supported by the electrical receptacle. In most instances the electrical supply is the general-purpose alternating-current (AC) electric power supply received at the residence, retail building, office, commercial building etc. However, in other instances it may be a different AC electrical power supply derived from the general-purpose AC or another power supply such as a generator. In other instances, the electrical supply may be a direct-current (DC) electrical supply. General-purpose AC is typically 110V/120V or 220V/230V/240V at either 50 Hz or 60 Hz. However, in other instances it may be at other frequencies such as 400 Hz for example in avionics applications.

A "wireless standard" as used herein and throughout this disclosure refers to, but is not limited to, a standard for transmitting signals and/or data through electromagnetic radiation which may be optical, radio-frequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

A "wired standard" as used herein and throughout this disclosure, generally refer to, but is not limited to, a standard for transmitting signals and/or data through an electrical cable discretely or in combination with another signal. Such wired standards may include, but are not limited to, digital subscriber loop (DSL), Dial-Up (exploiting the public switched telephone network (PSTN) to establish a connection to an Internet service provider (ISP)), Data Over Cable Service Interface Specification (DOCSIS), Ethernet, Gigabit home networking (G.hn), Integrated Services Digital Network (ISDN), Multimedia over Coax Alliance (MoCA), and Power Line Communication (PLC, wherein data is overlaid to AC/DC power supply). In some embodiments a "wired standard" may refer to, but is not limited to, exploiting an optical cable and optical interfaces such as within Passive Optical Networks (PONs) for example.

A "user" as used herein may refer to, but is not limited to, but is not limited to, an individual or group of individuals. This includes, but is not limited to, private individuals, employees of organizations and/or enterprises, members of community organizations, members of charity organizations, men, women and children. In its broadest sense the user may further include, but not be limited to, mechanical systems, robotic systems, android systems, etc. that may be characterised by an ability to exploit one or more embodiments of the invention.

A "sensor" as used herein may refer to, but is not limited to, a transducer providing an electrical output generated in dependence upon a magnitude of a measurand selected from the group comprising, but is not limited to, environmental sensors, medical sensors, biological sensors, chemical sensors, ambient environment sensors, position sensors, motion sensors, thermal sensors, infrared sensors, visible sensors, RFID sensors, and medical testing and diagnosis devices.

FIG. 1A depicts a work box, receptacle and faceplate according to the prior art of the inventor which provide a mechanism for making use of standard building wiring to provide additional functionality. As depicted in FIG. 1A an electrical receptacle 100A is provided which allows for an insert to be inserted into a cavity within the receptacle body. As depicted the standard electrical receptacle provides two outlets and is installed into an electrical utility work box 1100 once the electrical supply is coupled to the electrical receptacle 100A via an electrical cable that is fed through an opening within the electrical utility work box 1100 which may be defined or established through an installing user selecting one "push-out" of a plurality of "push-outs" provided within the body of the electrical utility work box 1100. Once the electrical receptacle 100A is inserted into the electrical utility work box 1100 and retained in position, e.g. via bolts at upper and lower locations then a faceplate 1200 is typically applied.

Figure 1B:
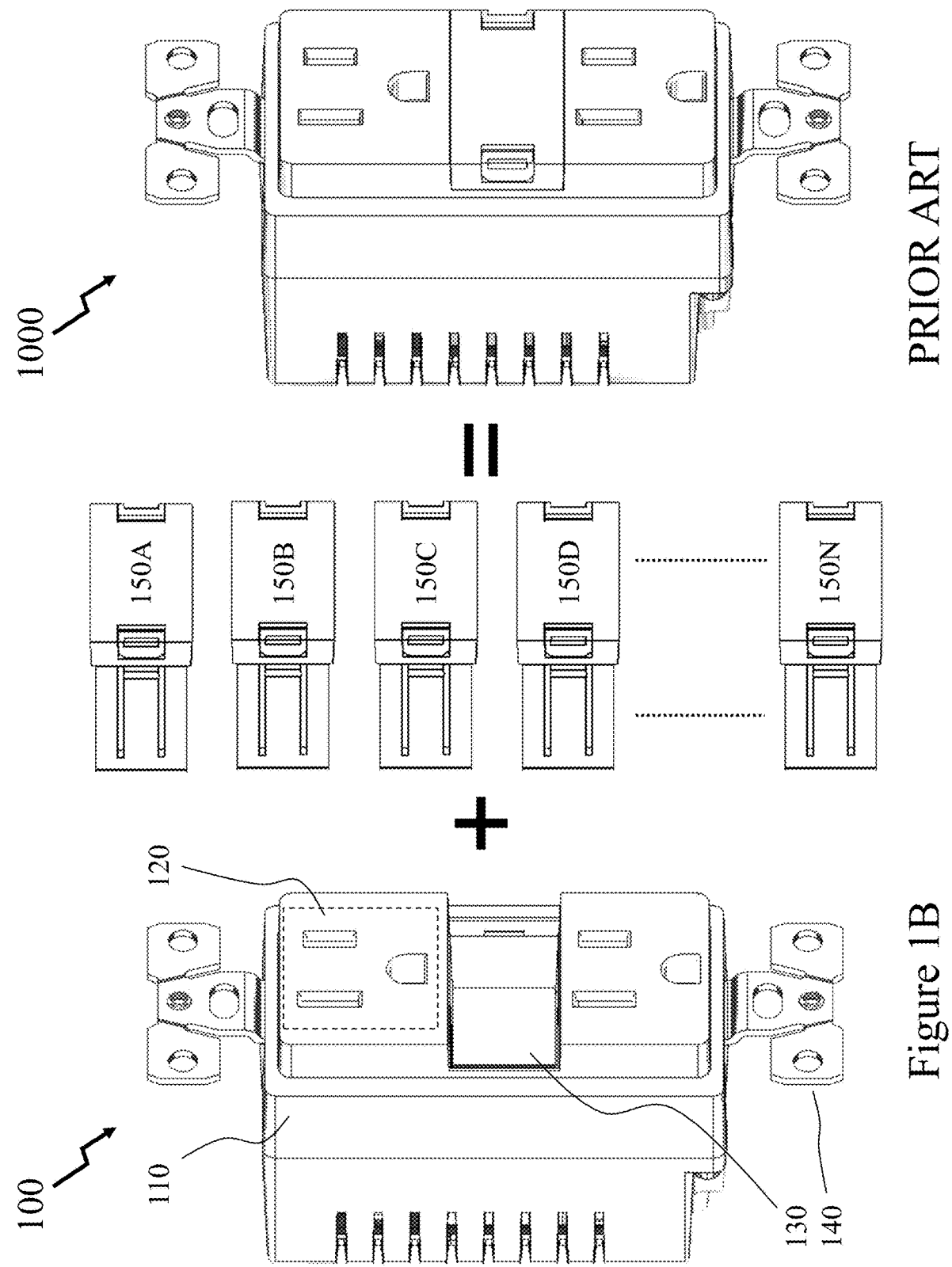
FIG. 1B depicts a configurable electrical receptacle according to the prior art of the inventor.

Once the electrical receptacle 100A has been connected to the electrical supply and inserted into the electrical utility work box 1100 and the faceplate 1200 attached then an initial blank cover 1300 for the cavity can be replaced with a replaceable insert such as depicted in FIG. 1B. Referring to FIG. 1B there is depicted a configurable electrical receptacle 1000 comprising an electrical receptacle 100 which features a receptacle body 110 within which are disposed a pair of electrical sockets 120 and a cavity 130. The configurable electrical receptacle 1000 being attached to the electrical utility work box, not shown for clarity, via the ground strap 140. A replaceable insert may be disposed within the cavity 130 such as inserts 150A to 150N respectively which may comprise a blank insert 150A, Wi-Fi node 150B, nightlight 150C, motion detector 150D and smoke detector 150N. Accordingly, electrical receptacle 1000 provides dual electrical sockets and a user selectable function with the one of the plurality of inserts 150A to 150N respectively.

In common with this approach embodiments of the invention may be designed with dimensions and retaining feature positions etc. to function with industry standard receptacle boxes and faceplates. Due to the position of the electrical receptacle cavity between the pair of electrical outlets the faceplate is similarly attached via upper and lower retaining features, e.g. bolts to threaded portions of the electrical receptacle. As will become evident in respect of FIGS. 2 to 12 other designs may support faceplates with alternate mounting positions and "cut-out" design such as a single central retaining means for example.

Figure 2:
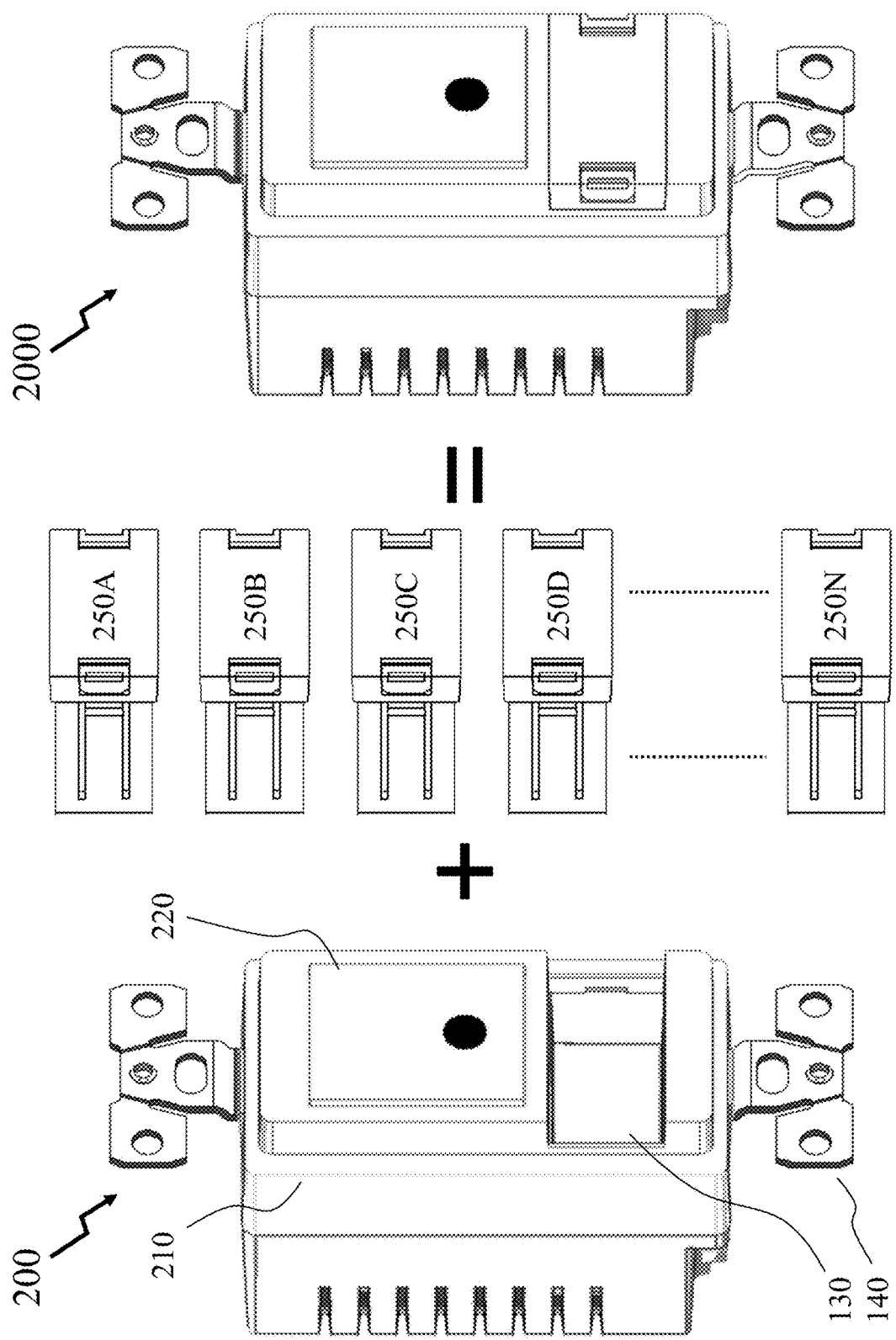
FIG. 2 depicts a configurable electrical switch receptacle according to an embodiment of the invention.

Now referring to FIG. 2 depicts a configurable switch receptacle 2000 according to an embodiment of the invention which comprises a switch receptacle 200 which features a receptacle body 210 within which is an electrical switch 220 and a cavity 130. The configurable switch receptacle 2000 being attached to the electrical utility work box, not shown for clarity, via the ground strap 140. A replaceable insert may be disposed within the cavity 130 such as inserts 250A to 250N respectively which may comprise a blank insert 250A, motion detector 250B, light 250C, Bluetooth 250D and USB charger 250N. Accordingly, switch receptacle 2000 as depicted provides a push type electrical switch 220 with an illuminated element to indicate status and a user selectable function with the one of the plurality of inserts 250A to 250N respectively.

Figure 3:
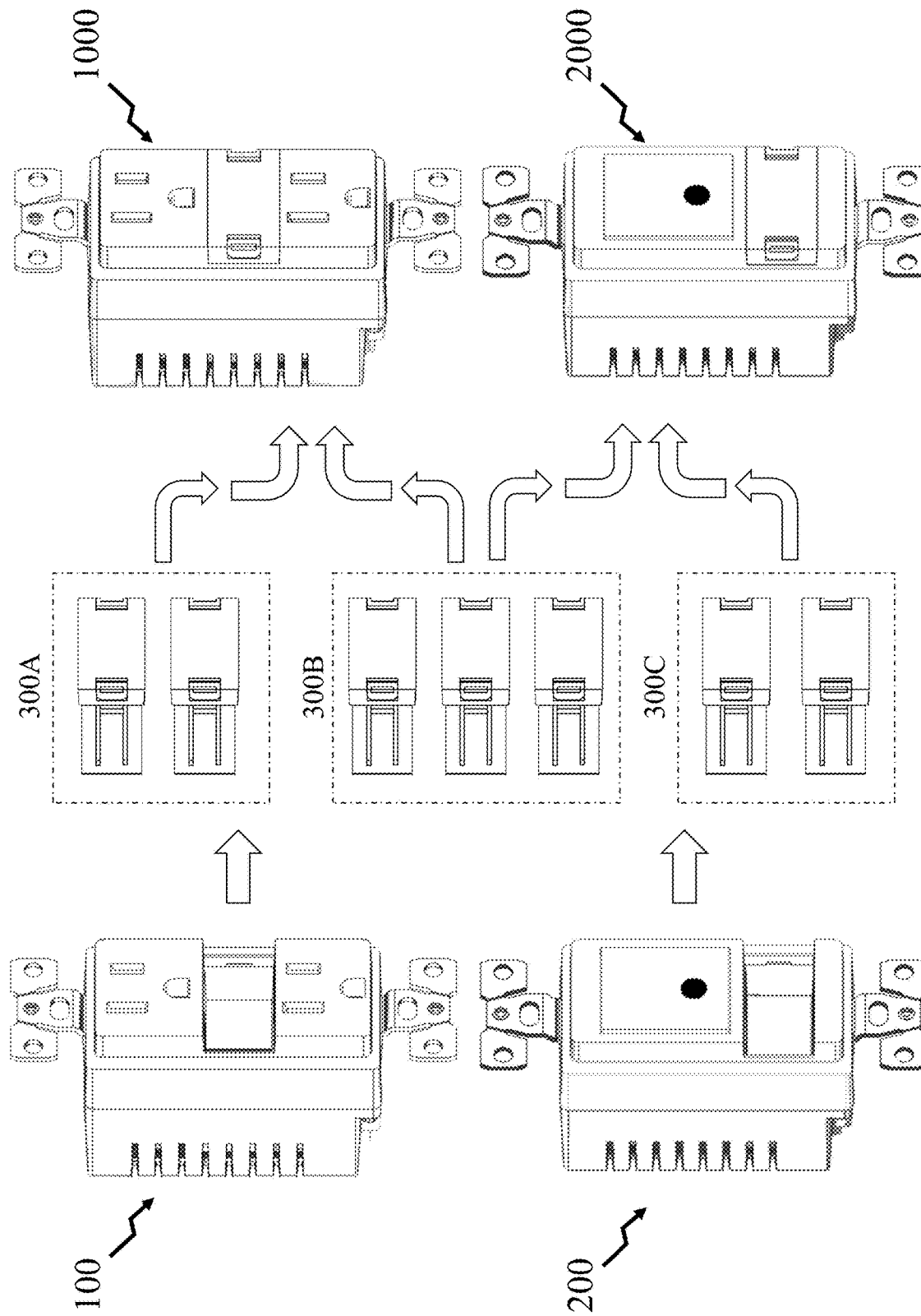
FIG. 3 depicts restriction of inserts to electrical receptacles only, electrical switches only, and both electrical receptacles and switches according to an embodiment of the invention.

Now referring to FIG. 3 there are depicted application of insert restrictions to electrical receptacles only, electrical switches only, and both electrical receptacles and switches according to an embodiment of the invention. Accordingly, an electrical receptacle 100 is depicted wherein inserts from first insert group 300A and second insert group 300B can be inserted into its cavity and make the appropriate electrical and mechanical connections to power the insert and form configurable electrical receptacle 1000. Similarly, switch receptacle 200 may be employed in combination with an insert selected from the second insert group 300B and third insert group 300C which when into the cavity makes the appropriate electrical and mechanical connections to power the insert and form and provide configurable switch receptacle 2000. Accordingly, three classes of insert are defined:

First class 300A which fit the electrical receptacle 100 only;
Second class 300A which fit either the electrical receptacle 100 or switch receptacle 200; and
Third class 300C which fit the switch receptacle 200 only.

Referring to FIG. 4 there is depicted a configuration of insert and receptacle circuit board supporting restriction of receptacles such as depicted in FIG. 3 according to an embodiment of the invention. Referring to first image 400A there is depicted a perspective view of parts of the receptacle, e.g. receptacle 100 and insert 150/250. The receptacle portion depicted being the main PCB 450. As depicted the insert portion comprises insert shell 410, insert PCB 420, insert latches 440 and USB socket 430 as the insert 150/250 provides a USB charger wherein the insert PCB 420 provides a stabilized USB interface supporting power and data. Optionally, a USB insert may be solely for charging an electrical device or it may support data communications through the USB to a device connected to it by a user which are then transmitted to/from the USB insert either via a wireless interface (forming part of the USB insert) or through power line communications (PLC) via the electrical supply to/from the insert.

Next in second image 400B the PCB 450 is depicted absent any components for simplicity except electrical connector 480 visible through opening within the back wall of the insert shell 410 whilst the insert 150/250 now depicts only insert shell 410, the insert latch portion 440 and its keyed openings 460. Finally, third image 400C depicts only the PCB 450 with electrical connector 480 and keyed posts 470.

Figure 4A:
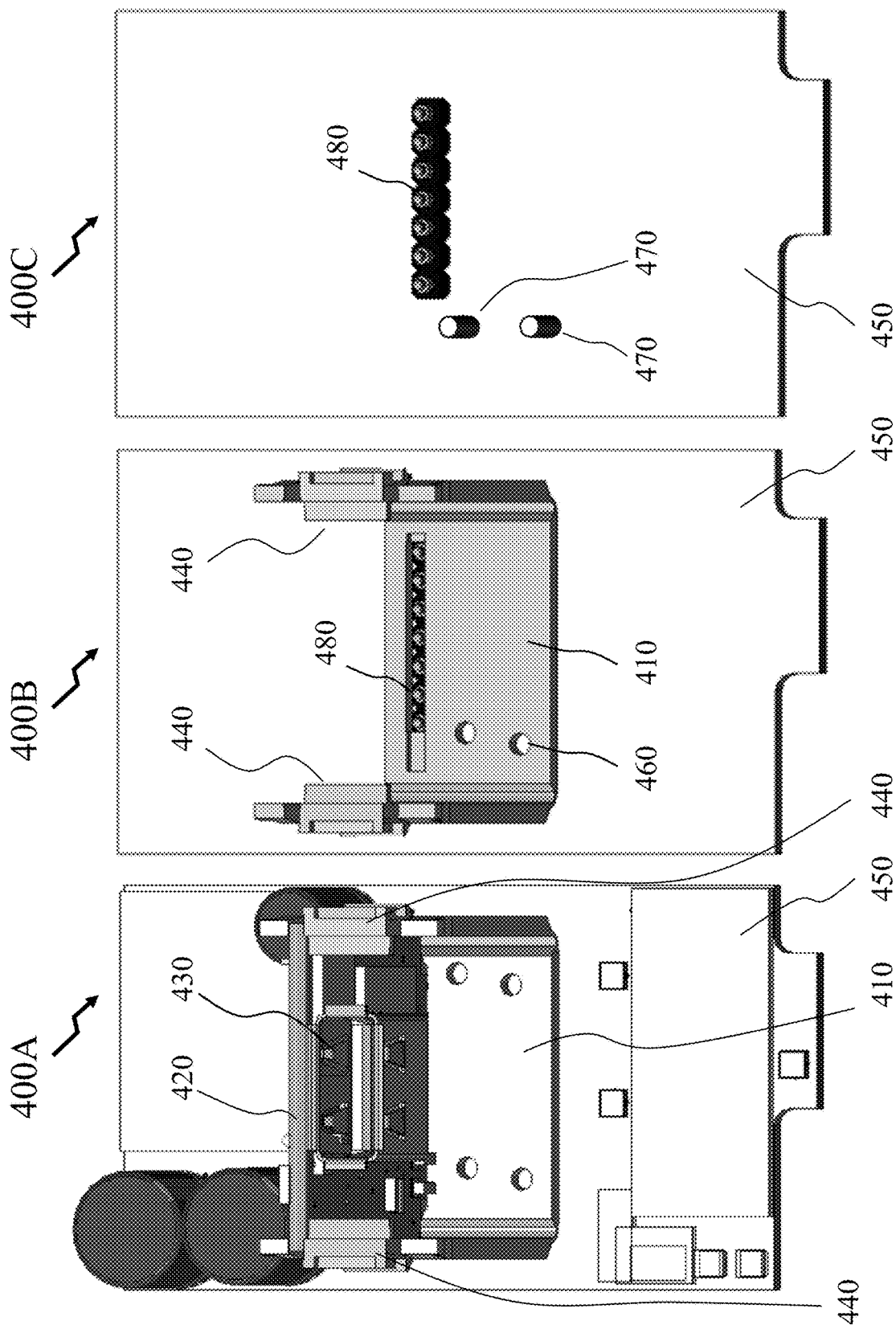
FIG. 4A depicts a configuration of insert and receptacle circuit board supporting restriction of receptacles such as depicted in FIG. 3 according to an embodiment of the invention.
Figure 4B:
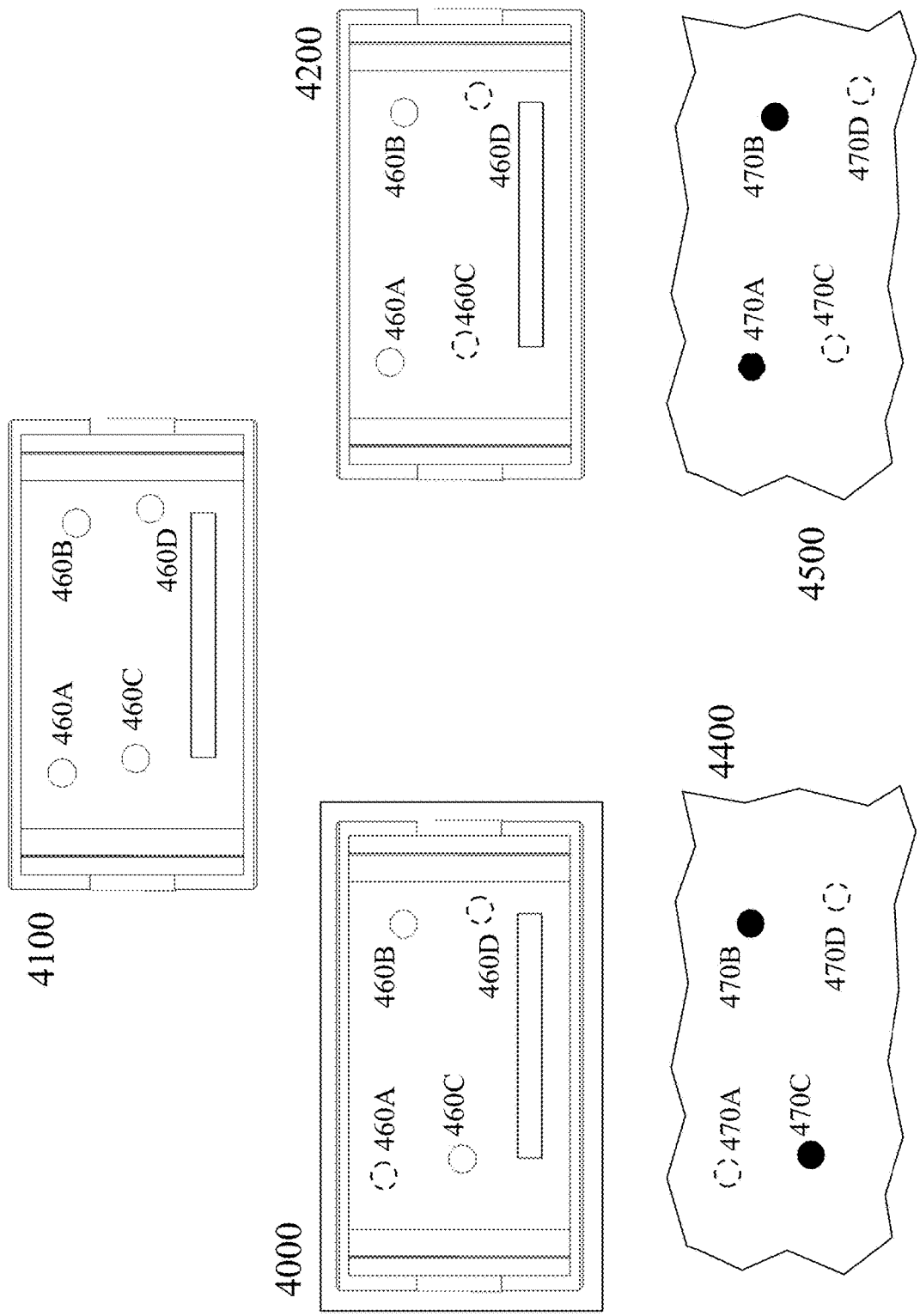
FIG. 4B depicts an exemplary pin-hole configuration for achieving the insert restrictions according to FIG. 3 according to an embodiment of the invention.

Accordingly, referring to FIG. 4B there are depicted an exemplary post 470—opening 460 configuration for achieving the insert restrictions according to FIG. 3 according to an embodiment of the invention wherein a first class 300A which fit the electrical receptacle 100 only, a second class 300A which fit either the electrical receptacle 100 or switch receptacle 200, and a third class 300C which fit the switch receptacle 200 only. As depicted first to third rear views 4000 to 4200 depict the rear wall of the insert shell for the first, second, and third classes respectively.

First rear view 4000 depicts the openings 460B and 460C which are presented from the four potential opening positions 460A to 460D respectively. Now referring to first PCB configuration 4400 there are depicted the occupied posts 470B and 470C of the four potential post positions 470A to 470D respectively. Accordingly, when the openings 460B and 460C correspond to the posts 470B and 470C such that when the insert with first rear view is inserted into a receptacle with first configuration 4400 with posts 470B and 470C the combination allows the insert to be inserted fully engaging the electrical connector 480 on the PCB 450 to the electrical connections within the insert (not shown for clarity) and a latching mechanism within the receptacle, see for example receptacle latch portion 610 in FIG. 6, to engage with that of the insert, insert latch portion 440. However, if the insert is instead inserted into a receptacle with second configuration 4500 the posts configured as depicted in positions 470A and 470B the insert cannot be inserted fully preventing the electrical connection being made and the engagement of the latching mechanism.

However, an insert with third rear view 4200 with openings 460A and 460B would align and be fully insertable with second configuration 4500. It would be evident that the third rear view 4200 does not align with the posts of first configuration 4400 thereby preventing an insert with third rear view 4200 being inserted into a receptacle with posts in first configuration 4400. However, second rear view 4100 has openings 460A to 460D and will accordingly accept posts in either of the first and second configurations 4400 and 4500 respectively.

It would be evident to one of skill that in each instance the insertion of the insert into a receptacle in an inverted position will not match any post configuration and accordingly an insert cannot be inserted upside down. Hence, in this manner a configuration of openings and posts as depicted in FIG. 4B provides the three classes of inserts. It would be evident that other configurations of "posts" and "openings" may be employed to achieve the same result. It would also be evident that the configuration may be adjusted according to whether two, three, four or more classes of insert are intended for use in different subsets of two, three, four or more receptacles.

Figure 5:
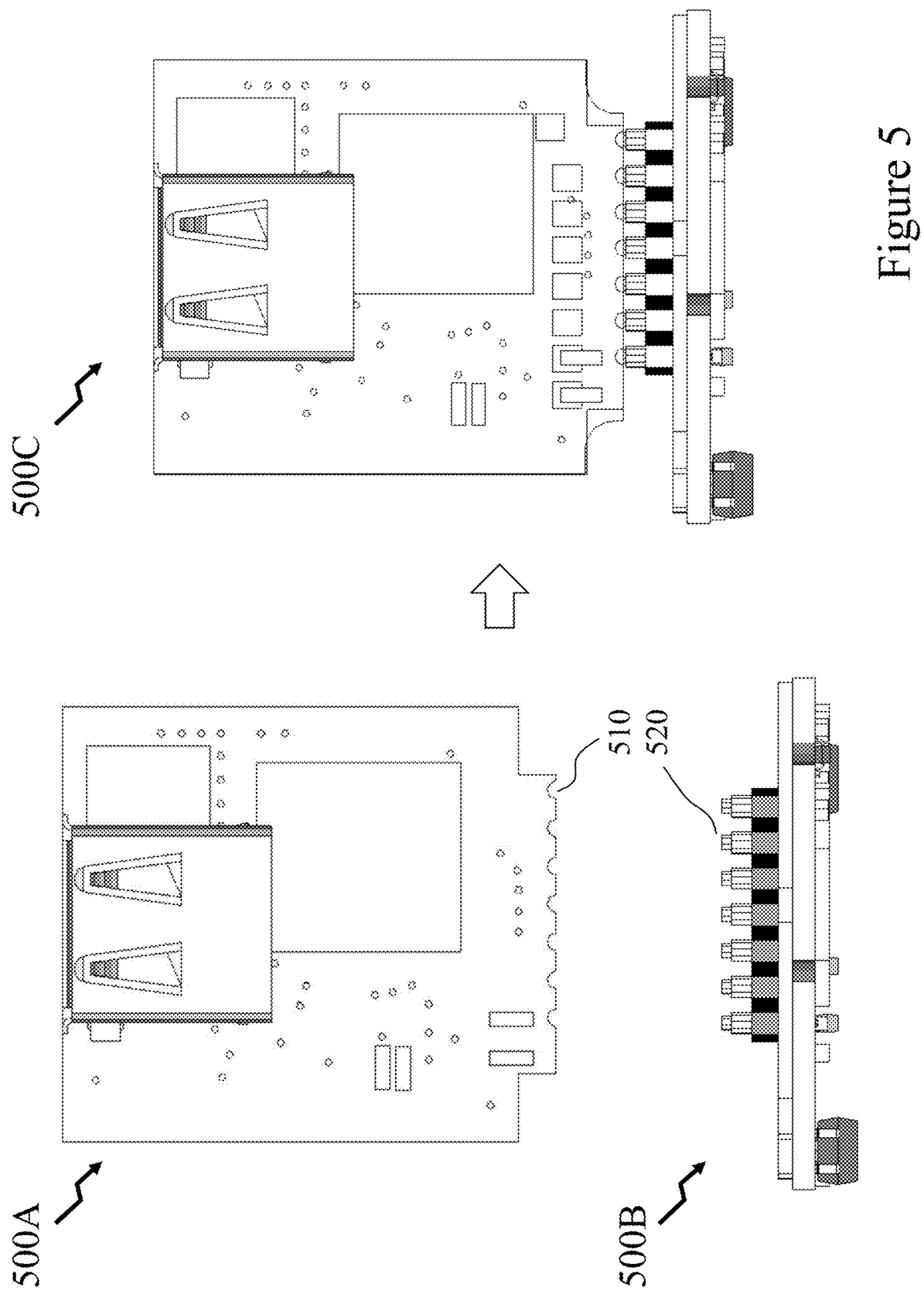
FIG. 5 depicts an edge connection between the insert and receptacle circuit board according to an embodiment of the invention.
Figure 6:
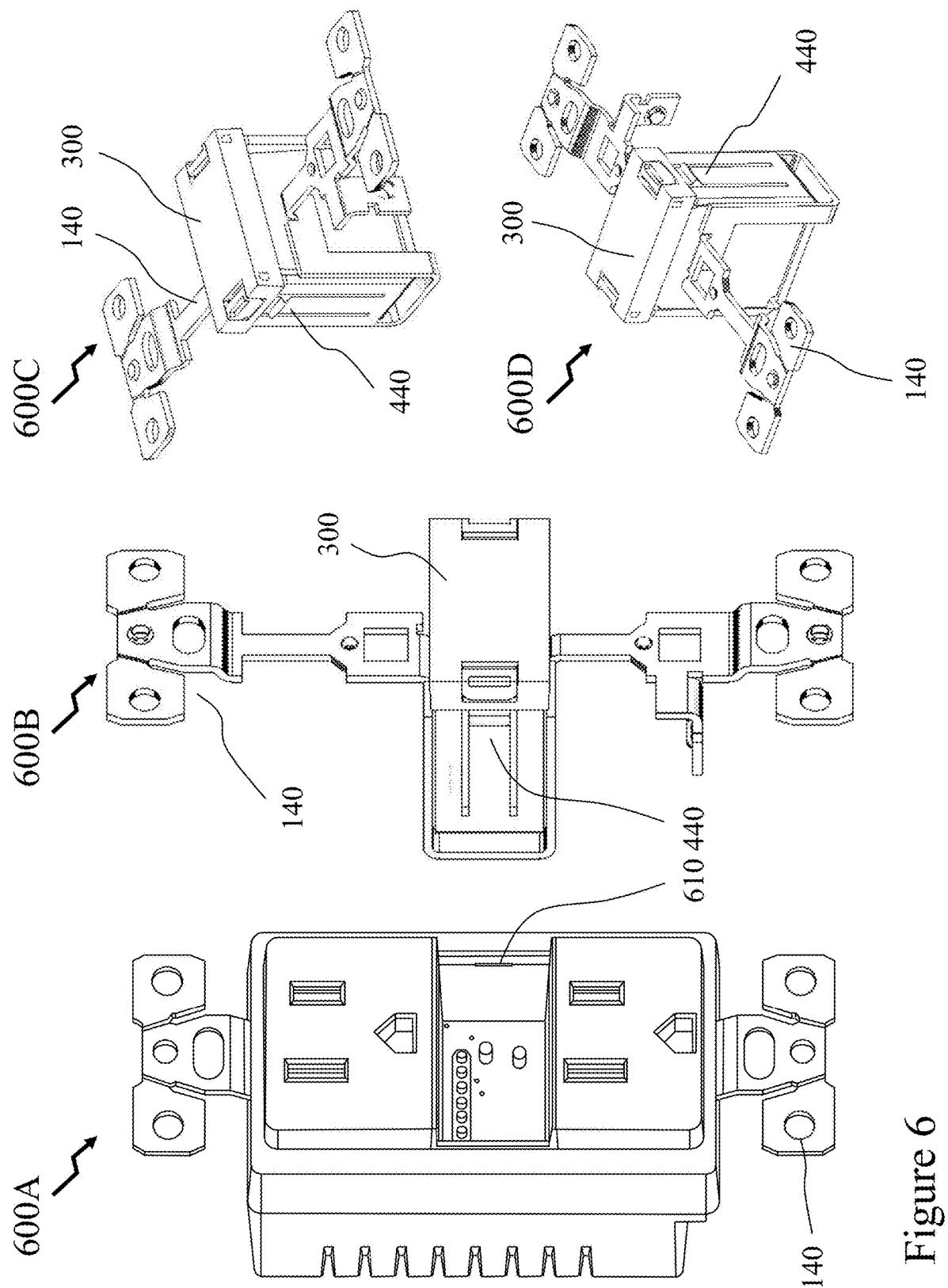
FIG. 6 depicts an internal ground bar configuration according to an embodiment of the invention providing grounding of the insert prior to electrical connectivity with the receptacle circuit board.

Now referring to FIG. 5 there is depicted an edge connection between the insert and receptacle circuit board according to an embodiment of the invention for low complexity and low cost. Accordingly, there is depicted an insert PCB 500A together with receptacle PCB 500B as discrete elements and as assembled when the insert is inserted into a receptacle cavity keyed to access that insert. As depicted with insert PCB 500A the edge of the PCB where it will about the electrical connector contacts 520 is castellated and the inner edge of each recess is metallized to form an electrical contact with its respective electrical connector contact 520 when the insert is fully inserted as depicted in assembly 500C. In this manner, the mechanical positioning/retention of the insert relative to the receptacle cavity is managed by the latching/alignment mechanism, for example comprising insert latch portion 440 which engages receptacle latch portion 610 as depicted in FIG. 6, together with the posts/openings that define an allowable insertion. The electrical connection is a mechanical contact without additional complexity. It would be evident that within other embodiments of the invention the insert PCB 500A may be configured with an electrical connector or electrical connectors in socket and/or plug whilst the receptacle PCB is configured with the matching plug and/or socket electrical connector or connectors. For example, these may include, but are not limited to single in-line (SIL) headers, dual in-line headers (DIL), card edge connectors, backplane connectors, micro-USB, and mini-USB.

Referring to FIG. 6 there is depicted an internal ground bar configuration according to an embodiment of the invention providing grounding of the insert prior to electrical connectivity with the receptacle circuit board with low complexity and low cost. A receptacle 600A is depicted with ground strap 140 which provides the mounting points for the receptacle 600A to its electrical utility work box (not shown for clarity) and the faceplate (not shown for clarity) to the receptacle 600A such that ground connections can be made to protect the user. Accordingly, the ground strap 140 may be grounded to the electrical utility work box directly when it is metal or conductive plastic or via a grounding connection made to both the receptacle 600A and the work box. Also depicted in receptacle latch portion 610 on the inner face of the opening within the receptacle 600A.

However, it is not evident whether the insert is grounded prior to full insertion and the electrical connections being made between the insert 300 and the receptacle 600A. Accordingly first to third assembly images 600B to 600D respectively depict the ground strap 140 absent all other elements of the receptacle 600A wherein it is evident that the ground strap is formed such that it is around the cavity over at least part of the cavity width such that as the insert is inserted it makes electrical contact to the ground plane. Accordingly, either through a conductive plastic shell for the insert or metal contacts on the upper and/or lower surfaces of the insert a ground contact is made as the insert is partially inserted and maintained through to the electrical connection such that in the event of a fault the insert is always grounded even though the accessible contacts within the cavity may be limited to an acceptable DC or AC voltage, e.g. 12V such that a user contacting them does not suffer harm. Optionally, the electrical construction may be reversed to that shown in FIG. 5 such that the "plug" portion of the electrical connector(s) on the insert-receptacle PCB connection are on the insert and the "socket" portion is on the receptacle PCB so that an errant finger cannot touch the electrical contacts. Also depicted in first to third assembly images 600B to 600D respectively are the insert latch portions 440 on the insert 300 which engage with the receptacle latch portions 610.

Figure 7:
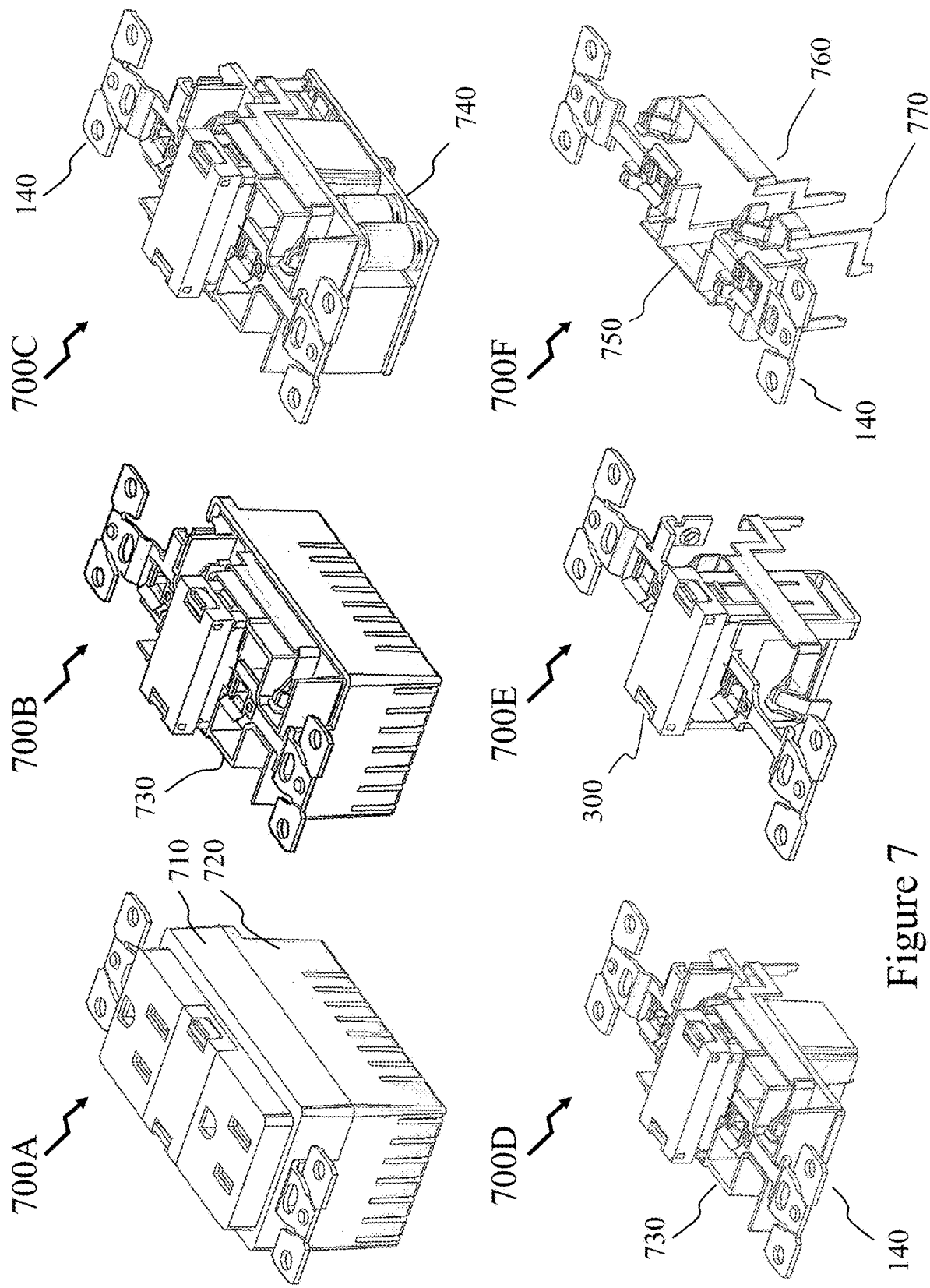
FIG. 7 depicts a sequential break down of an electrical receptacle according to an embodiment of the invention.

FIG. 7 there is depicted a sequential break down of a receptacle according to an embodiment of the invention such that:

First image 700A depicts the full receptacle with front casing 710 and rear casing 720;

Second image 700B with the front casing 710 removed showing the internal frame 730;

Third image 700C with the rear casing 720 removed showing the receptacle PCB 740;

Fourth image 700D wherein the receptacle PCB 740 has been removed showing more of the internal frame 730;

Fifth image 700E with the internal frame 730 removed showing the insert 300 within the grounding strap 140; and Sixth image 700F with the insert 300 removed showing the ground strap 140 and first to third electrical straps 750 to 770 respectively which provide the connections to the live and neutral pins of the electrical sockets.

Figure 8A:
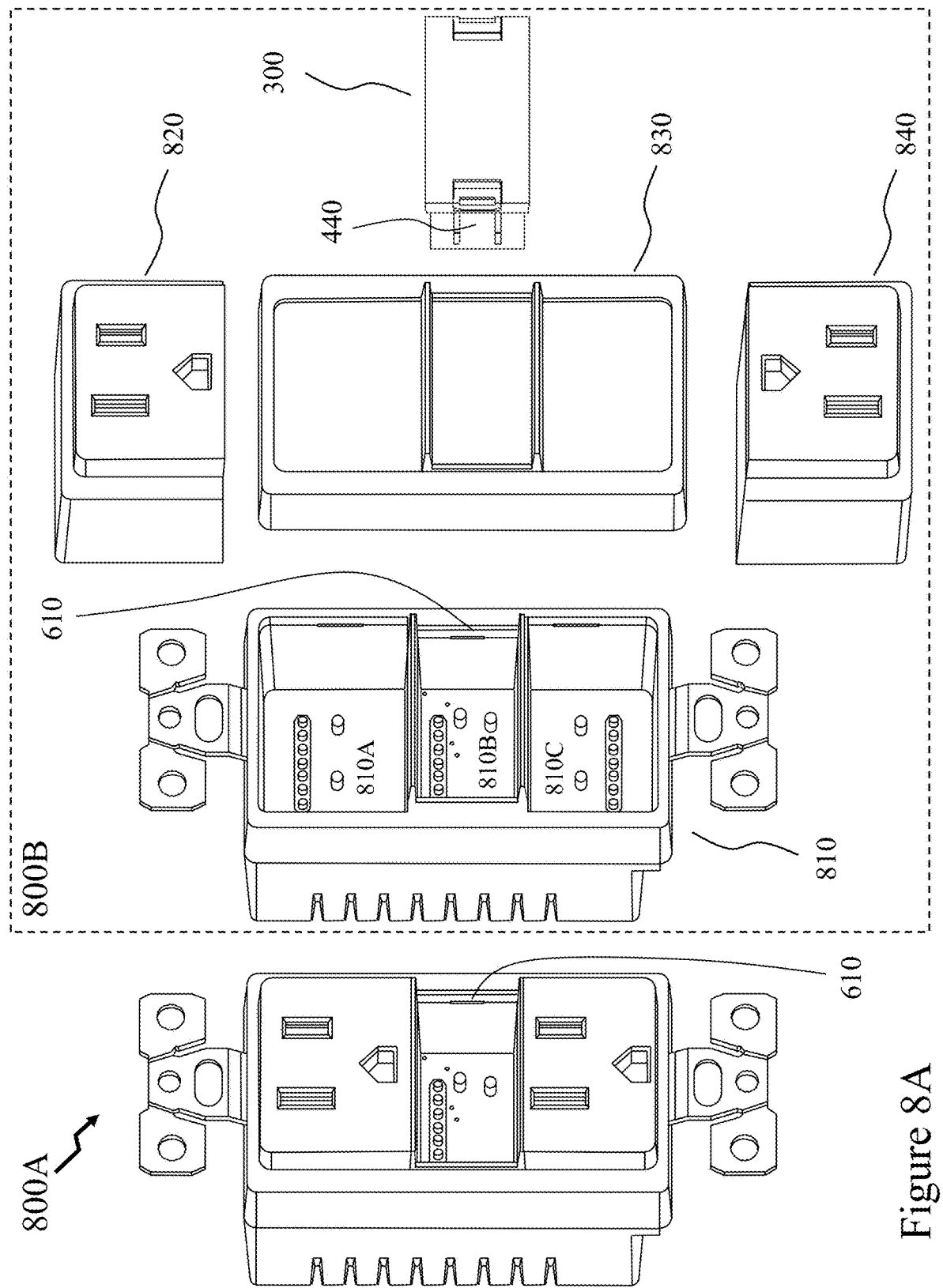
FIG. 8A depicts a configurable electrical receptacle according to an embodiment of the invention wherein the installed functionality can be set at installation leaving the post-installation receptacle configuration.

FIG. 8A there is depicted a configurable electrical receptacle according to an embodiment of the invention wherein the installed electrical functionality is set in two stages:

Stage 1: configuration of mains supply electrical elements; and

Stage 2: configuration of insert.

Accordingly, as depicted in second image 800B a series of elements are depicted which when assembled provide the receptacle depicted in first image 800A. There is therefore a receptacle body 810, an upper electrical element 820, a lower electrical element 840 and a cover 830 together with insert 300. At installation the first and second electrical elements 820 and 840 are inserted into first and third cavities 810A and 810C respectively whilst the insert 300 would be inserted into second cavity 810B wherein the insert latch portions 440 on either side of the insert 300 engage the receptacle latch portions 610 on the inner lateral faces of the second cavity 820B. Once the first and second electrical elements 820 and 840 are inserted into first and third cavities 810A and 810C respectively the cover 830 is attached and retained, for example, via one or more bolts through the rear of the receptacle body to the rear of the cover 830.

Accordingly, as depicted in second image 800B a series of elements are depicted which when assembled provide the receptacle depicted in first image 800A. There is therefore a receptacle body 810, an upper electrical element 820, a lower electrical element 840 and a cover 830 together with insert 300. At installation the first and second electrical elements 820 and 840 are inserted into first and third cavities 810A and 810C respectively whilst the insert 300 would be inserted into second cavity 810B. Once the first and second electrical elements 820 and 840 are inserted into first and third cavities 810A and 810C respectively the cover 830 is attached and retained, for example, via one or more bolts through the rear of the receptacle body to the rear of the cover 830.

Figure 8B:
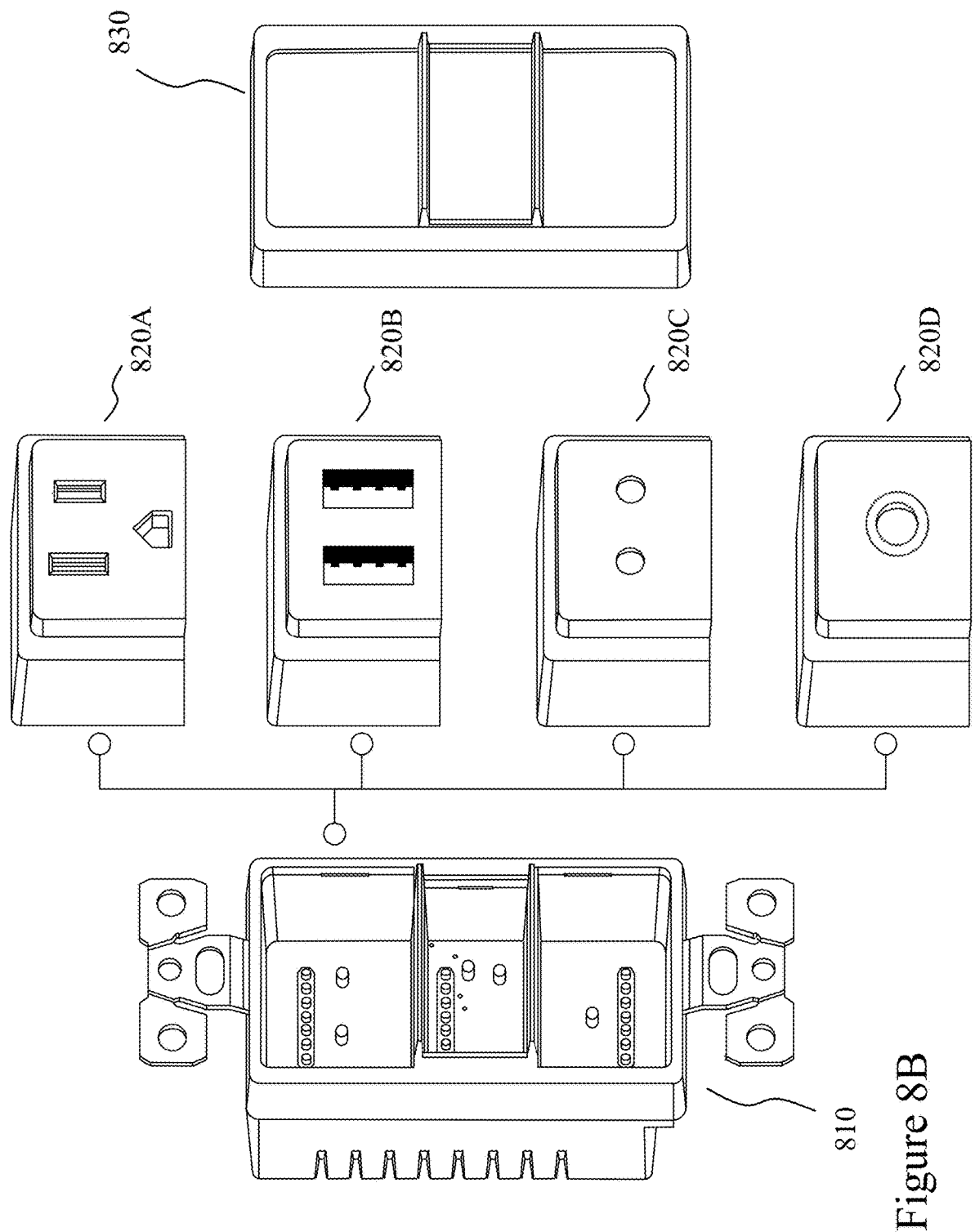
FIG. 8B depicts a configurable electrical receptacle according to an embodiment of the invention wherein the installed functionality can be set at installation leaving the post-installation receptacle configuration.

Now referring to FIG. 8B there is depicted a configurable receptacle according to the configuration depicted in FIG. 8A wherein the installed functionality set at installation can be varied by changing the electrical element. As depicted alternate electrical elements 820A to 820D are depicted comprising electrical socket, dual USB interface, UK shaver plug socket, and 2.1 mm DC socket. As depicted the second element cavity is configured as a 180° rotation of the first element cavity such that, for example, first electrical element 820A can be used in both cavities. Optionally, within other embodiments of the invention such a configuration may be limited such that different upper and lower elements are required. Further, the concept discussed supra in respect of configuring inserts to fit only certain receptacles can be applied such that only certain electrical elements can be inserted into one or other cavity or both cavities etc.

The multiple cavities within a receptacle body 810 and cover 830 are further depicted in FIG. 9 according to the embodiment of the invention depicted in FIG. 8A. Accordingly, the receptacle 810 has first to third cavities 910 to 930 respectively within each being backplane connectors 910A to 930A respectively and keying posts 910B to 930B respectively. As depicted the cover 830 has three openings 970 to 990 that align with the first to third cavities 910 to 930 respectively. The design of the cover is such that when attached electrical elements cannot be inserted into the first and third cavities 910 and 930 through the cover openings 970 and 990 but an insert 300 (not depicted for clarity) can be inserted through opening 980 into second cavity 910B. Within embodiments of the invention the sequence of which cavities permit use of inserts versus may change. Also depicted within the first to third cavities 910 to 930 are first to third receptacle latching portions 940 to 960 respectively.

Optionally, within an embodiment of the invention using an example of three cavities all three cavities may be identical but the sequence of which accept elements prior to installation and which accept inserts after installation is defined by the cover applied. Accordingly, the cover may restrict the cavity by projecting within the cavity such that the dimensions of an insert are smaller than that of an electrical element. In this manner the insert may be in the first, second, or third cavity based upon the cover applied.

Figure 10:
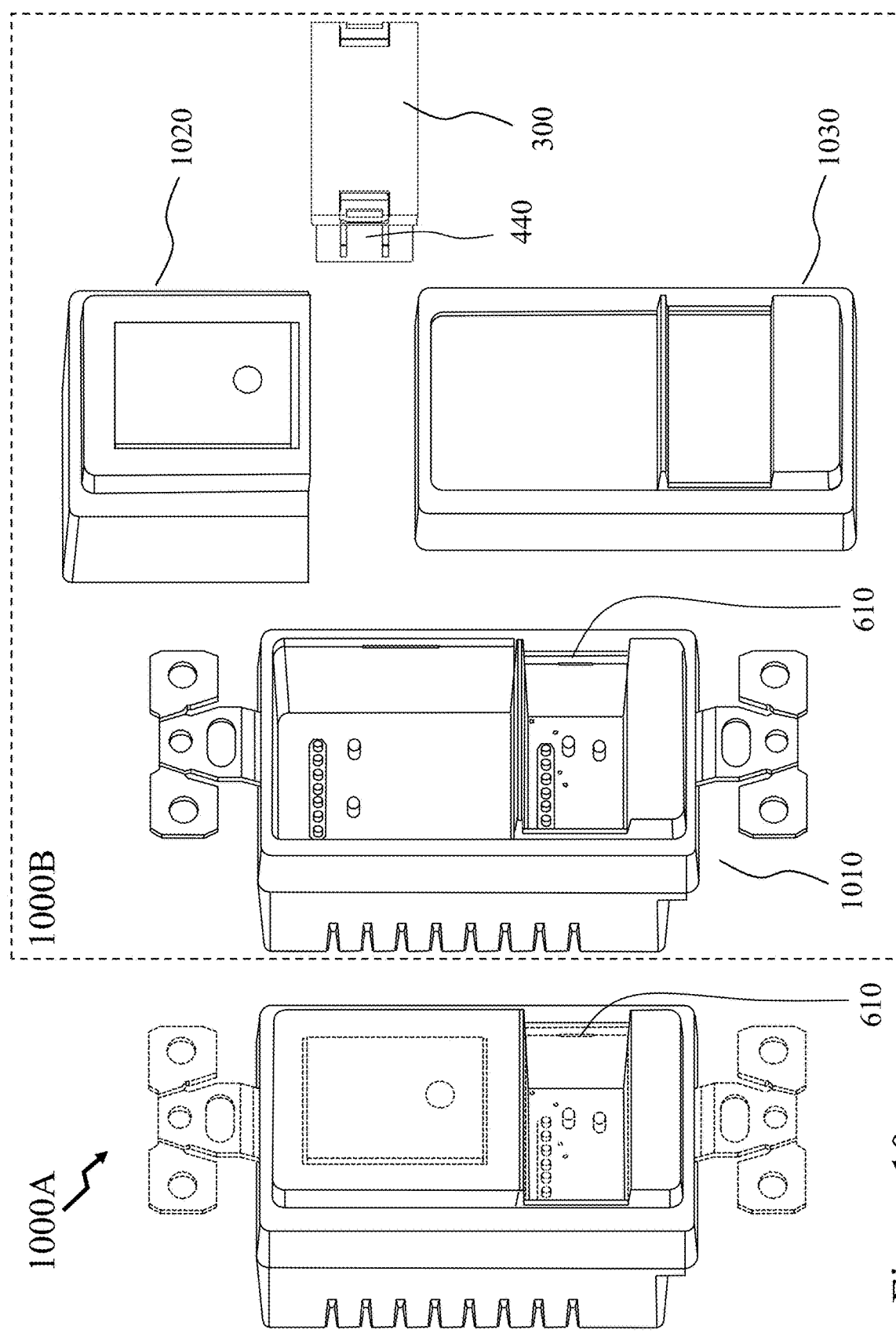
FIG. 10 depicts a configurable switch receptacle according to an embodiment of the invention wherein the installed functionality can be set at installation leaving the post-installation receptacle configuration.
Figure 11:
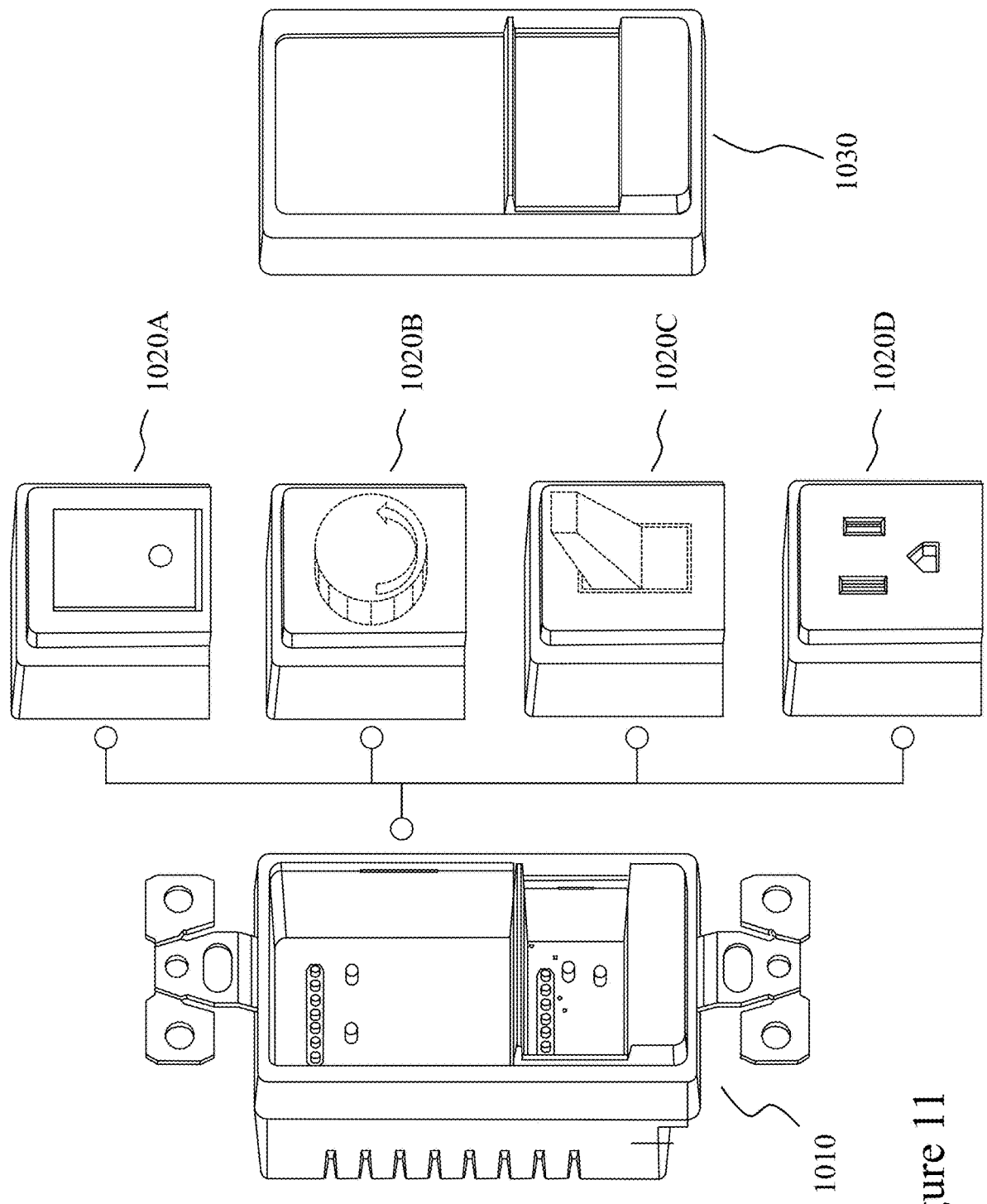
FIG. 11 depicts a configurable receptacle and cover according to an embodiment of the invention.

Accordingly, it would be evident to one of skill in the art that this concept may be extended as depicted in FIG. 10 for a configurable switch receptacle according to an embodiment of the invention wherein the installed switch functionality can be set at installation leaving the post-installation receptacle configuration via the insert(s). Accordingly, as depicted in second image 1000B a series of elements are depicted which when assembled provide the receptacle depicted in first image 1000A. There is therefore a receptacle body 1010, an electrical element 1020 and a cover 1030 together with insert 300. Also depicted are receptacle latch portions 610 within the openings within the receptacle body 1010 which mate with the insert latch portions 440 on the insert 300 to retain the insert 300 in position. In this manner as depicted in FIG. 11 the receptacle 1010 may be configured with first to fourth switch elements 1020A to 1020D which depict push toggle switch 1020A, rotary dimmer 1020B, rocker switch 1020C, and electrical socket 1020D.

Figure 12:
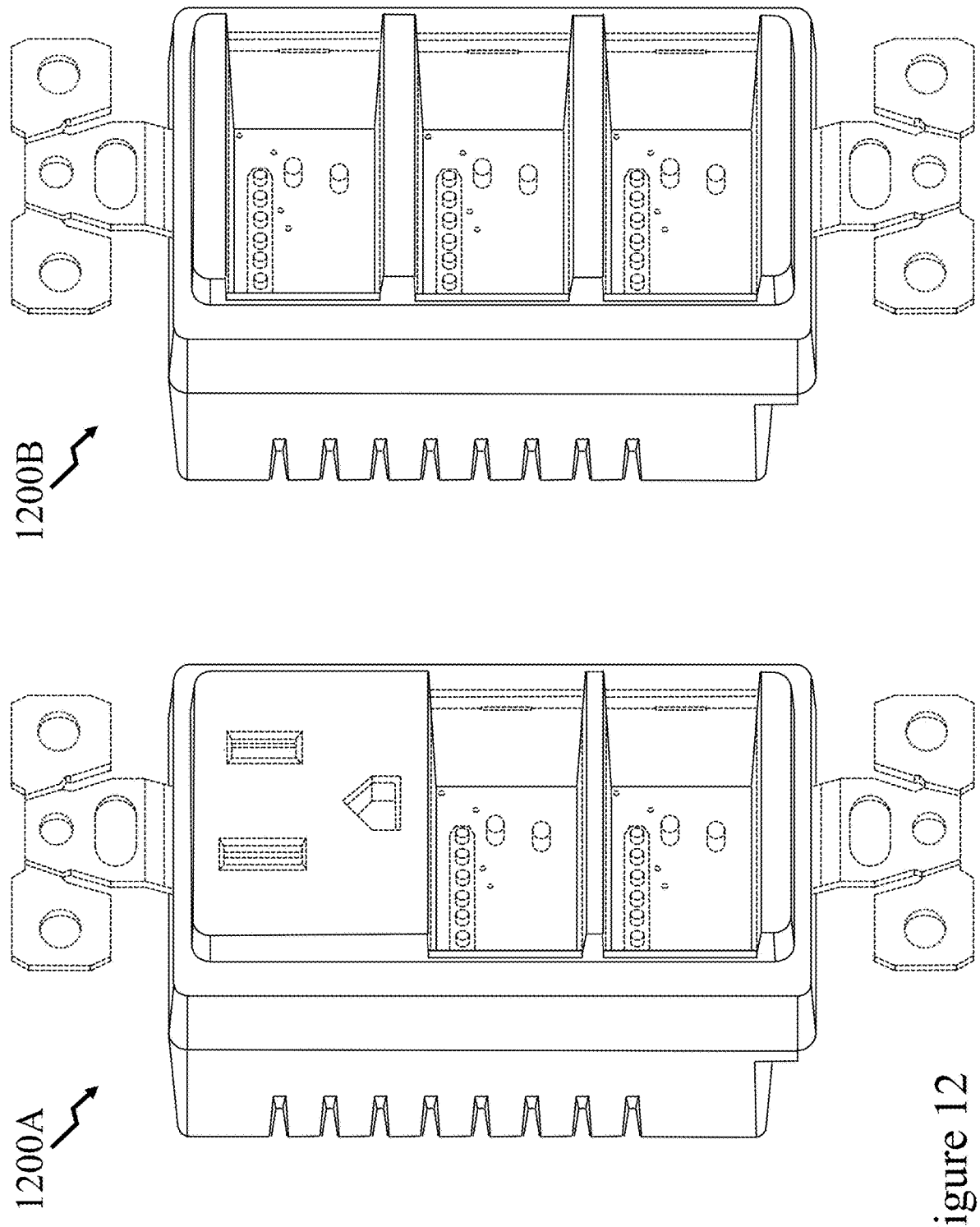
FIG. 12 depicts configurable receptacles according to embodiments of the invention.

Further, as depicted in FIG. 12 configurable receptacles according to embodiments of the invention may employ two or three (or potentially more) inserts.

It would be evident that the concepts described and depicted within FIGS. 2 to 12 may be exploited in 2-gang, 3-gang, 4-gang etc. configurations as well as the 1-gang design depicted. Accordingly, this would reduce the number of electrical wiring connections to be made by providing a single receptacle which then supports a grid of configurable elements and/inserts.

Within embodiments of the invention depicted in respect of FIGS. 2 to 12 the presumption has been that the removable inserts are removed manually without special tooling. However, within other embodiments of the invention a tool may be required to insert and/or remove the insert. Similarly, a tool may also be required to insert and/or remove electrical elements such as sockets, switches, dimmers, etc.

Optionally, within embodiments of the invention the electrical elements may be inserted and retained without an overlaying cover but are "latched" into position and then covered with the faceplate wherein this then covers the required access to remove the electrical elements with a tool, for example. As described and depicted within FIGS. 4A, 6, 8A, 9 and 10 this latching may be provided via insert latch portions on the insert which engage receptacle latch portions within the recess within the receptacle body. In this manner, removal of the faceplate and use of the appropriate extraction tool allows the electrical elements to be reconfigured and then re-covered with the faceplate. Optionally, the electrical elements may be retained through screw/bolt fixtures through the rear of the receptacle or the front wherein these are then obscured/hidden via a cover and faceplate or just a faceplate. In each instance the removable inserts are inserted/removed from the receptacle when the cover and faceplate or just faceplate are in position.

Amongst the inserts the inventors have considered a USB plug and associated cable wherein the cable is wound in combination with a spring mechanism or other mechanism that allows for the cable to rewind automatically. Optionally, the cable may be pulled to the required length and ratcheted to lock and then if pulled to full extension the ratcheting disengaged and the cable rewinds. Alternatively, a button or other mechanism on the front of the insert removes the locking ratchet and allows rewinding.

Within another insert an emergency light is powered upon power failure based upon a capacitor within the insert rather than a battery. The capacitor being maintained at charge and connected based upon a switch defaulting to connect the light, e.g. LED, upon power failure.

Within the embodiments of the invention the presumption has been that the receptacles are powered from a mains supply, such as 120V 60 Hz in North America. Within other embodiments of the invention the power supply may be a low voltage supply such as 12V, 24V, or 48V DC.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
   a receptacle comprising a cavity disposed with a front face of the receptacle wherein the cavity comprises:
      a first portion of a latching mechanism;
      a first portion of a keying mechanism; and
      a plurality of first electrical contacts disposed upon a rear surface of the cavity;
   a demountable insert configured to fit within the cavity where the demountable insert comprises:
      a second portion of the latching mechanism;
      a second portion of the keying mechanism; and
      a plurality of second electrical contacts disposed upon a back surface of the demountable insert; wherein
   the keying mechanism prevents insertion of at least one of an incompatible demountable insert and a compatible demountable insert inserted into the cavity in an inverted manner;
   latching of the latching mechanism only occurs when the keying mechanism is successfully engaged; and
   electrical connections between the plurality of second electrical contacts and a subset of the plurality of first electrical contacts are only made when the latching mechanism is successfully engaged.

2. The system according to claim 1, wherein
   the demountable insert is retained in the cavity by the latching mechanism; and
   the latching mechanism and keying mechanism are independent of each other.

3. The system according to claim 1, wherein
   the demountable insert is retained in the cavity by the latching mechanism; and
   the latching mechanism and keying mechanism form part of a common mechanism.

4. The system according to claim 1, wherein
   the first portion of the latching mechanism is disposed upon one or more sidewalls of the cavity;
   the second portion of the latching mechanism is disposed upon one or more surfaces of the demountable insert disposed between the rear surface of demountable insert and a distal front surface of the demountable insert;
   the first portion of the latching mechanism and the second portion of the latching mechanism are disposed towards the front face of the receptacle and the front face of the demountable insert respectively such that the latching mechanism can be disengaged from the front of the receptacle once the demountable insert has been inserted.

5. The system according to claim 1, wherein
   the latching mechanism automatically latches once the first portion of the keying mechanism and the second portion of the keying mechanism have allowed insertion of the demountable insert into the cavity to a predetermined depth.

6. The system according to claim 1, wherein
   the demountable insert is an insert of a plurality of inserts;
   the first portion of the keying mechanism has either a first configuration or a second configuration;
   a first portion of the plurality of inserts have a configuration of the second portion of the keying mechanism that can only engage with the first configuration of the first portion of the keying mechanism to enable the latching of the latching mechanism; and
   a second portion of the plurality of inserts have another configuration of the second portion of the keying mechanism that can only engage with the second configuration of the first portion of the keying mechanism to enable the latching of the latching mechanism.

7. The system according to claim 1, wherein
   the demountable insert is an insert of a plurality of inserts;
   the first portion of the keying mechanism has either a first configuration or a second configuration;
   a first portion of the plurality of inserts have a configuration of the second portion of the keying mechanism that can only engage with the first configuration of the first portion of the keying mechanism to enable the latching of the latching mechanism;
   a second portion of the plurality of inserts have another configuration of the second portion of the keying mechanism that can only engage with the second configuration of the first portion of the keying mechanism to enable the latching of the latching mechanism; and
   a third portion of the plurality of inserts have a further configuration of the second portion of the keying mechanism that can engage with either the first configuration of the first portion of the keying mechanism or the second configuration of the first portion of the keying mechanism to enable the latching of the latching mechanism.

8. The system according to claim 1, wherein
   the demountable insert is an insert of a plurality of inserts;
   the receptacle is one of:
      an electrical receptacle having at least one of an electrical plug and an electrical socket accessible on a same face of the receptacle as that within which the cavity is disposed; and
      a lighting receptacle having a lighting control interface on the same face of the receptacle as that within which the cavity is disposed;
   the first portion of the keying mechanism has a first configuration when the receptacle is an electrical receptacle and a second configuration when the receptacle is a lighting receptacle;
   a first portion of the plurality of inserts have a configuration of the second portion of the keying mechanism that can only engage with the first configuration of the first portion of the keying mechanism to enable the latching of the latching mechanism;
   a second portion of the plurality of inserts have another configuration of the second portion of the keying mechanism that can only engage with the second configuration of the first portion of the keying mechanism to enable the latching of the latching mechanism; and
   a third portion of the plurality of inserts have a further configuration of the second portion of the keying mechanism that can engage with either the first configuration of the first portion of the keying mechanism or the second configuration of the first portion of the keying mechanism to enable the latching of the latching mechanism.

9. The system according to claim 1, wherein
the receptacle is one of:
an electrical receptacle having at least one of a main electrical plug and a mains electrical socket accessible on a same face of the receptacle as that within which the cavity is disposed;
a lighting receptacle having a lighting control interface on the same face of the receptacle as that within which the cavity is disposed;
another electrical receptacle having an electrical interface on the same face of the receptacle as that within which the cavity is disposed where the electrical interface provides at least one of direct current electrical power and alternating current electrical power;
a sensor receptacle having a sensor disposed on the same face of the electrical receptacle as that within which the cavity is disposed;
a wireless receptacle having one or more wireless interface disposed within the wireless receptacle.

10. A system comprising:
a receptacle comprising a cavity disposed with a front face of the receptacle and another cavity disposed within the front face of the receptacle wherein:
the cavity comprises a first portion of a latching mechanism, a first portion of a keying mechanism, and a plurality of first electrical contacts disposed upon a rear surface of the cavity; and
the another cavity comprises a plurality of second electrical contacts disposed upon a rear surface of the cavity;
a demountable insert configured to fit within the cavity of the receptacle where the demountable insert comprises:
a second portion of the latching mechanism;
a second portion of the keying mechanism; and
a plurality of third electrical contacts disposed upon a back surface of the demountable insert;
another demountable insert configured to fit within the another cavity of the receptacle where the demountable insert comprises:
a plurality of fourth electrical contacts disposed upon a back surface of the demountable insert; wherein
the keying mechanism prevents insertion of at least one of an incompatible demountable insert and a compatible demountable insert inserted into the cavity in an inverted manner;
latching of the latching mechanism only occurs when the keying mechanism is successfully engaged; and
electrical connections between the plurality of third electrical contacts and a subset of the plurality of first electrical contacts are only made when the latching mechanism is successfully engaged.

11. The system according to claim 10, further comprising
a cover for use in conjunction with the attachment to be positioned in a predetermined relationship to the receptacle comprising:
an opening positioned to align with the cavity once the cover has been attached in the predetermined relationship to the receptacle;
another opening positioned to align with the another cavity once the cover has been attached in the predetermined relationship to the receptacle;
a first portion of an attachment means where the first portion of the attachment means is employed within a second portion of the attachment means to attach the cover either to receptacle or an element within which the receptacle is disposed; wherein
the opening within the cover is dimensioned to allow removal or insertion of the demountable insert into the cavity through the opening once the cover is positioned in the predetermined relationship to the receptacle and attached to either the receptacle or the element within which the receptacle is disposed; and
the another opening within the cover is dimensioned to prevent removal or insertion of the another demountable insert once the cover is positioned in the predetermined relationship to the receptacle and attached to either the receptacle or the element within which the receptacle is disposed.

12. The system according to claim 10, wherein
the another demountable insert is one of:
an electrical insert having at least one of a main electrical plug and a mains electrical socket accessible on an externally accessible face of the another demountable insert when the another demountable insert is inserted within the another cavity; and
a lighting receptacle having a lighting control interface on the externally accessible face of the another demountable insert when the another demountable insert is inserted within the another cavity; and
the demountable insert is one of:
another electrical insert having an electrical interface on an externally accessible face of the demountable insert when the demountable insert is inserted within the cavity where the electrical interface provides at least one of direct current electrical power and alternating current electrical power;
a sensor receptacle having at least one of an optical emitter and an optical receiver sensor disposed on externally accessible face of the demountable insert when the demountable insert is inserted within the cavity;
another sensor receptacle having one or more sensor disposed within the demountable insert; and
a wireless receptacle having one or more wireless interface disposed within the demountable insert.

13. A system comprising:
a receptacle comprising at least one of one or more cavities disposed with a front face of the receptacle and one or more other cavities disposed within the front face of the receptacle wherein:
each cavity of the one or more cavities comprises a first portion of a latching mechanism, a first portion of a keying mechanism, and a plurality of first electrical contacts disposed upon a rear surface of the cavity; and
each other cavity of the one or more other cavities comprises a plurality of second electrical contacts disposed upon a rear surface of the cavity;
one or more demountable inserts each configured to fit within a cavity of the one or more cavities of the receptacle where each demountable insert comprises:
a second portion of the latching mechanism;
a second portion of the keying mechanism; and
a plurality of third electrical contacts disposed upon a back surface of the demountable insert;
one or more other demountable inserts each configured to fit within an other cavity of the one or more other cavities of the receptacle where each demountable insert comprises:
a plurality of fourth electrical contacts disposed upon a back surface of the demountable insert; wherein
each keying mechanism prevents insertion of at least one of an incompatible demountable insert and a compatible demountable insert inserted into a cavity of the one or more cavities in an inverted manner;

latching of each latching mechanism only occurs when its respective keying mechanism is successfully engaged; and electrical connections between the plurality of third electrical contacts and a subset of the plurality of first electrical contacts are only made between a demountable insert of the one or more demountable inserts and a cavity of the one or more cavities into which the demountable insert of the one or more demountable inserts is inserted when the latching mechanism of demountable insert of the one or more demountable inserts and the cavity of the one or more cavities into which the demountable insert of the one or more demountable inserts is inserted is successfully engaged.

14. The system according to claim 13, wherein each other demountable insert of the one or more other demountable inserts is one of:

an electrical insert having at least one of a main electrical plug and a main electrical socket accessible on an externally accessible face of the another demountable insert when the another demountable insert is inserted within the another cavity; and a lighting receptacle having a lighting control interface on the externally accessible face of the another demountable insert when the another demountable insert is inserted within the another cavity; and each demountable insert of the one or more demountable inserts is one of:

another electrical insert having an electrical interface on an externally accessible face of the demountable insert when the demountable insert is inserted within the cavity where the electrical interface provides at least one of direct current electrical power and alternating current electrical power;

a sensor receptacle having at least one of an optical emitter and an optical receiver sensor disposed on externally accessible face of the demountable insert when the demountable insert is inserted within the cavity;

another sensor receptacle having one or more sensor disposed within the demountable insert; and a wireless receptacle having one or more wireless interface disposed within the demountable insert.

* * * * *